Figure 1:
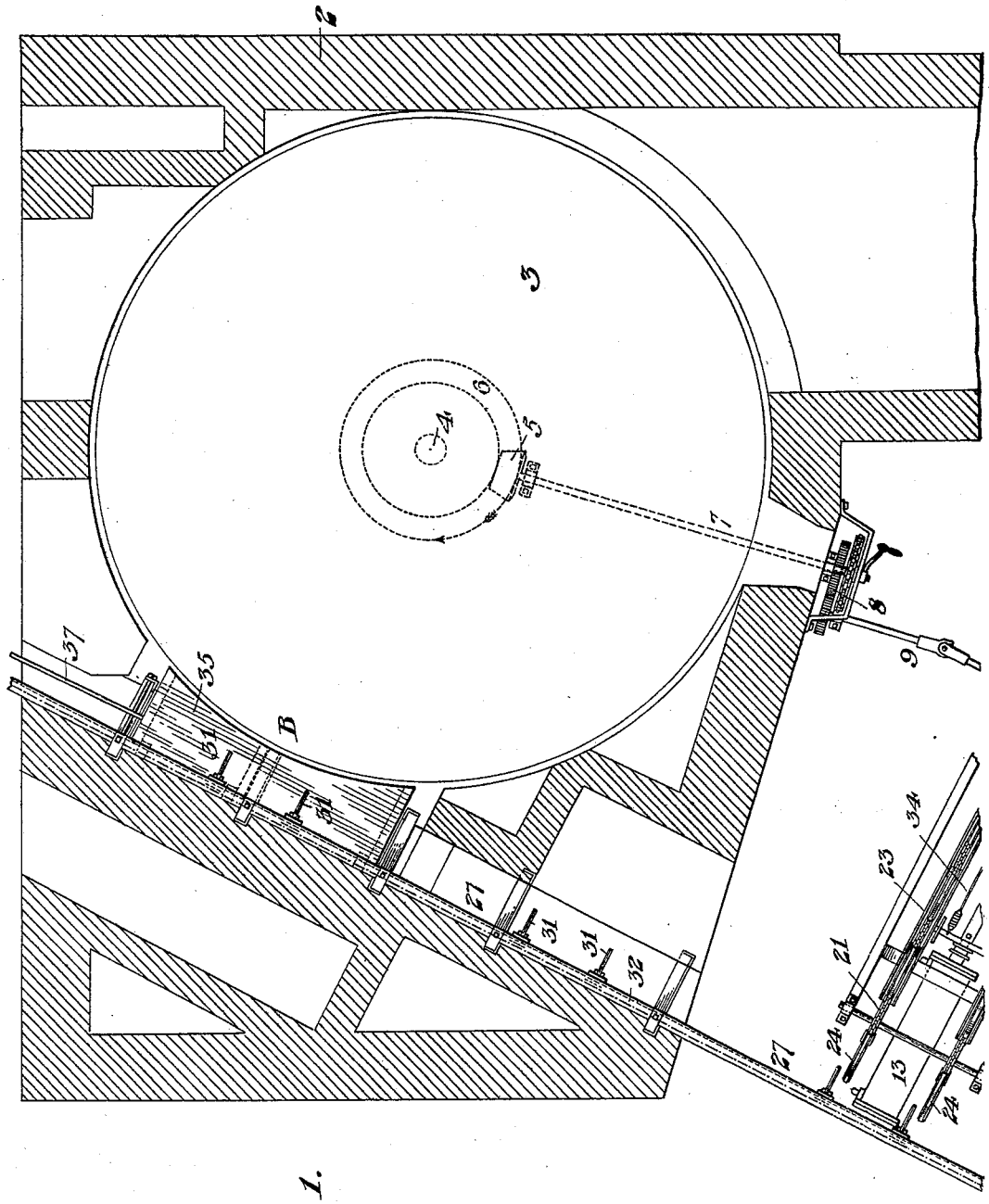

(No Model.) 4 Sheets—Sheet 1.

J. H. LUBBERS.
GLASS ANNEALING LEER.

No. 602,031. Patented Apr. 5, 1898.

WITNESSES

INVENTOR
John H. Lubbers
by Bakewell & Bakewell
his Attorneys.

(No Model.) 4 Sheets—Sheet 2.
J. H. LUBBERS.
GLASS ANNEALING LEER.
No. 602,031. Patented Apr. 5, 1898.
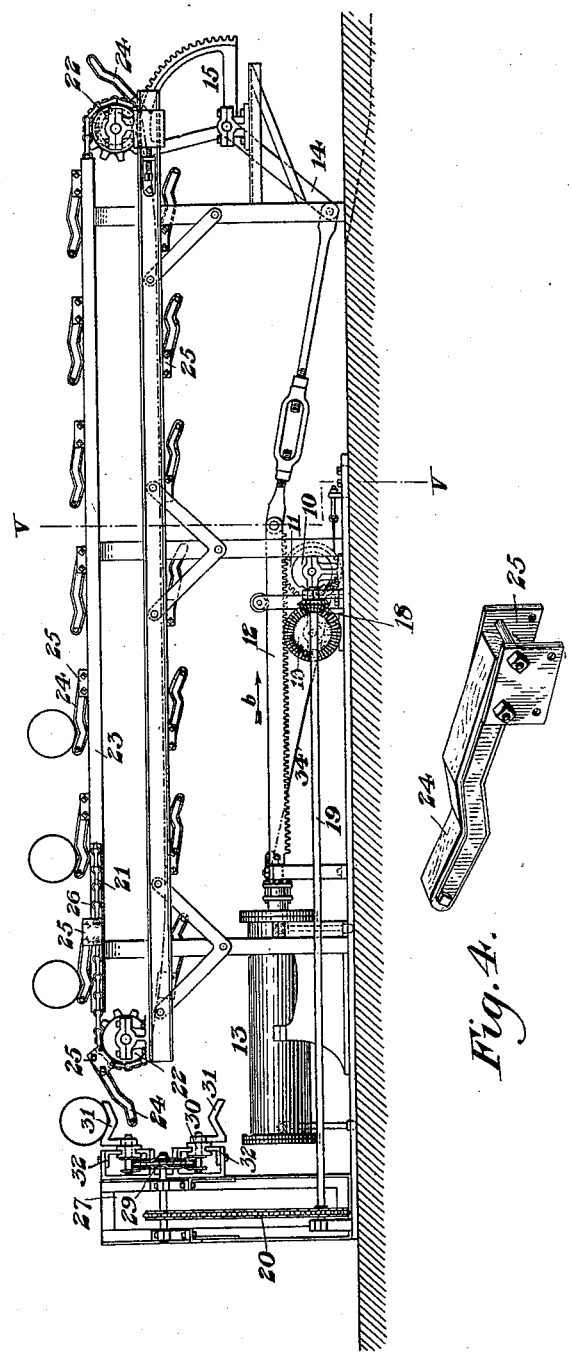
Fig. 2.
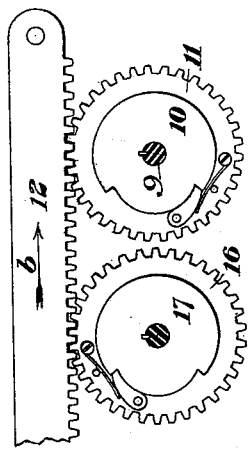
Fig. 3.
Fig. 4.
WITNESSES
INVENTOR
John H. Lubbers
by Bakewell & Bakewell
his Attorneys.

(No Model.) 4 Sheets—Sheet 3.
J. H. LUBBERS.
GLASS ANNEALING LEER.
No. 602,031. Patented Apr. 5, 1898.
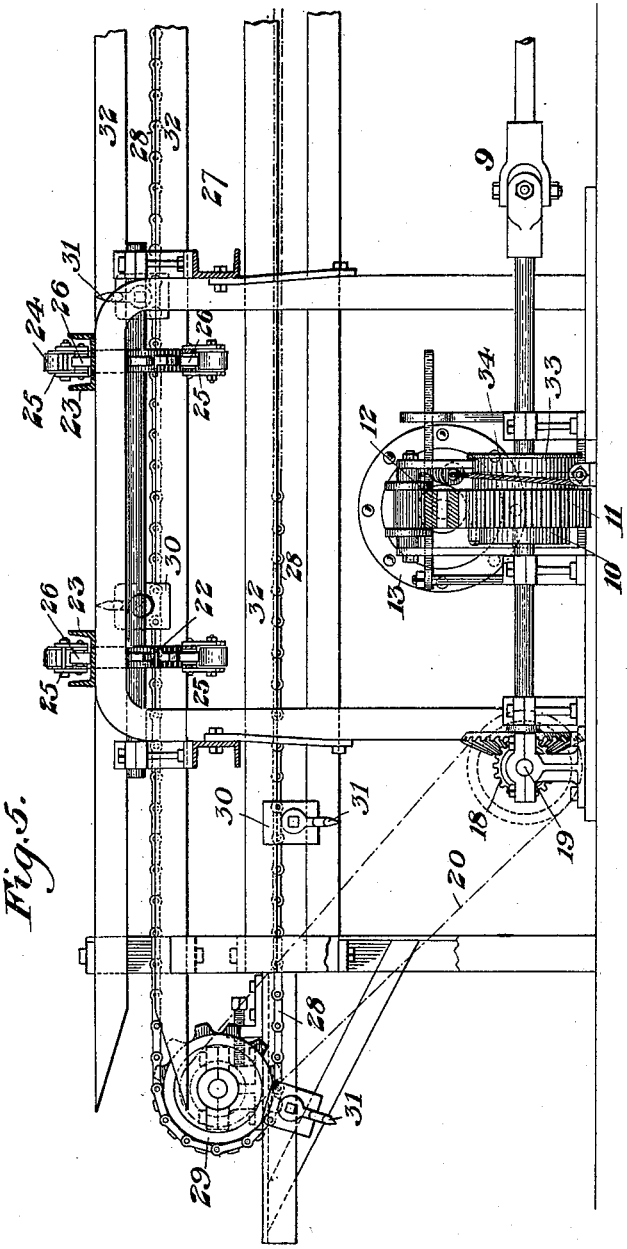
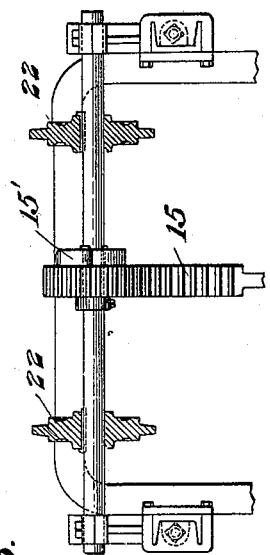
Fig. 6.
Fig. 5.
WITNESSES
INVENTOR
John H. Lubbers
by Bakewell & Bakewell
his Attorneys.

(No Model.)　　　　　　　　J. H. LUBBERS.　　　　　4 Sheets—Sheet 4.
GLASS ANNEALING LEER.
No. 602,031.　　　　　　　　　　　　　Patented Apr. 5, 1898.
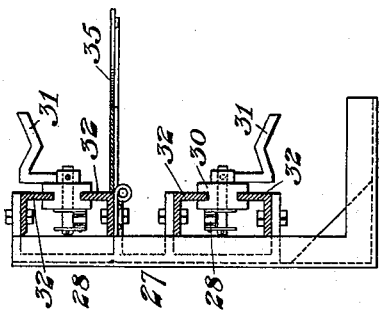
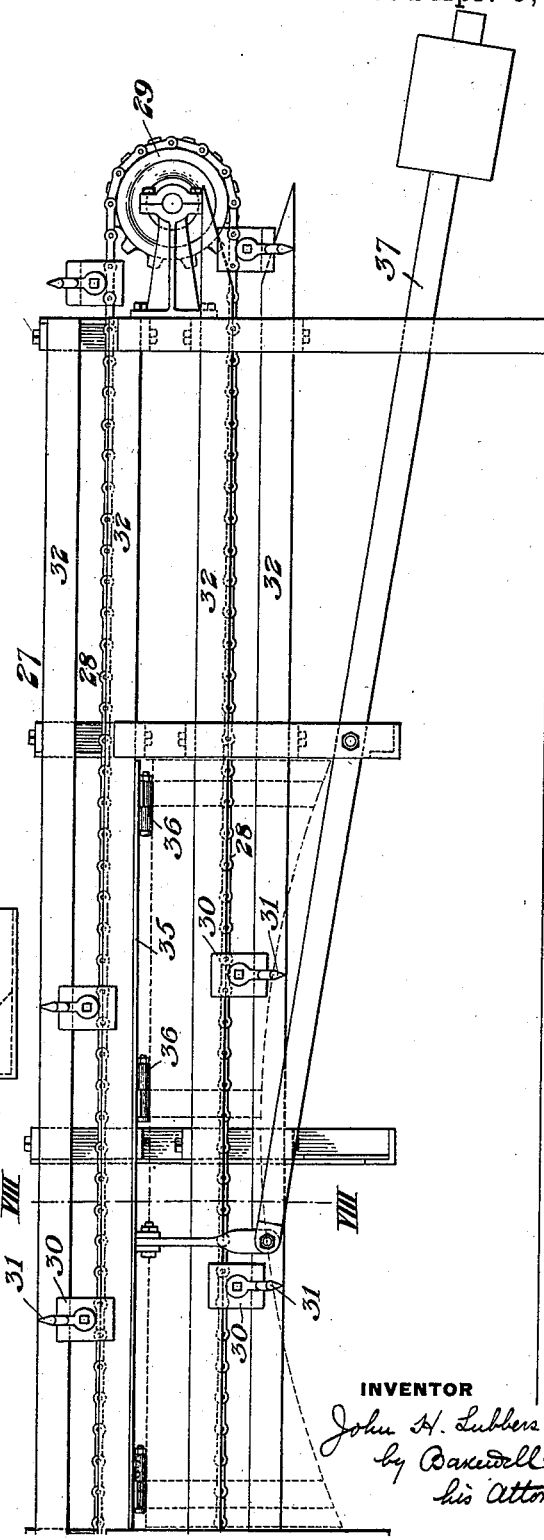
WITNESSES　　　　　　　　　　　　　　　INVENTOR
John H. Lubbers
by Bakewell & Bakewell
his Attorneys.

UNITED STATES PATENT OFFICE.

JOHN H. LUBBERS, OF NEW KENSINGTON, PENNSYLVANIA.

GLASS-ANNEALING LEER.

SPECIFICATION forming part of Letters Patent No. 602,031, dated April 5, 1898.

Application filed March 10, 1897. Serial No. 626,737. (No model.)

*To all whom it may concern:*

Be it known that I, JOHN H. LUBBERS, of New Kensington, in the county of Westmoreland and State of Pennsylvania, have invented a new and useful Improvement in Window-Glass Leers, of which the following is a full, clear, and exact description, reference being had to the accompanying drawings, forming part of this specification, in which—

Figure 1 is a horizontal section of a glass-flattening oven, showing a portion of the stick-hole carrier for conveying the glass rollers or cylinders to the flattening-table. Fig. 2 is a side elevation of the conveyer for delivering the glass cylinders or rollers to the carrier of Fig. 1, and in this figure said carrier is shown in end elevation. Fig. 3 is a detail view showing the rack and pinions by which I prefer to transmit motion to the several parts. Fig. 4 is a perspective view of one of the arms of the conveyer of Fig. 2. Fig. 5 is a vertical cross-section on the line V V of Fig. 2, showing the receiving end of the stick-hole carrier. Fig. 6 is a sectional end elevation of the conveyer shown in Fig. 2. Fig. 7 is a side elevation of the delivery end of the stick-hole carrier, showing also the tilting plate by which broken glass is discharged. Fig. 8 is a vertical section on the line VIII VIII of Fig. 7, showing the tilting plate and the arms on which the glass rollers are carried into the stick-hole. Fig. 9 is a perspective view of one of said arms and the slide to which it is attached.

The apparatus herein described is designed for the purpose of carrying glass cylinders or rollers through the stick-hole to the flattening-table of a window-glass-flattening furnace. By its use I effect this operation by mechanical means which may be under the control of the flattener, and I thus facilitate and expedite greatly the operation of flattening the glass.

The apparatus is an improvement upon the apparatus described in a prior patent, No. 492,765, granted to me February 28, 1893.

In the drawings, Fig. 1, 2 represents the wall of the flattening-oven. 3 is the horizontal flattening-table, centrally pivoted on an axis 4 and adapted to be turned by a pinion 5, working on a circular rack 6 on the under side of the table. Said pinion is connected by a shaft 7, gearing 8, shaft 9, and ratchet connection 10 to a pinion 11, Fig. 2, which is loosely mounted on the shaft 9 and is in gear with a reciprocatory rack 12. The ratchet connection is illustrated in Figs. 2 and 3, and the construction is such that when the rack 12 moves in the direction of the arrow *b* the shaft 9 will not be rotated, but when it is moved in the opposite direction the pawl will engage the tooth of the ratchet 10, which is keyed to the shaft 9, as shown in Fig. 3, and will thus rotate the shaft 9 and the flattening-table, turning the latter a partial revolution sufficient to carry the stones forward one step. The rack 12 is actuated by the plunger of a fluid-pressure cylinder 13, operated, preferably, by compressed air and controlled by valves placed within easy reach of the flattener. Said rack is connected also by a lever 14 to a segmental pinion 15, connected by a ratchet connection 15', Fig. 6, to a pinion by which the conveyer for feeding the glass cylinders to the stick-hole carrier is operated; and by means of a pinion 16 and ratchet connections 17, gearing 18, and shaft 19 the rack 12 is also connected with the driving-pinion of a sprocket-chain 20, by which the stick-hole carrier is moved. The ratchet connection 17 is illustrated in Fig. 3 and is adapted to move the stick-hole carrier at each motion of the rack 12 in the direction of the arrow *b* and throughout part of such motion of the rack, and the ratchet connection 15' in like manner is adapted to move the conveyer in each reverse motion of the rack. Each motion of the rack in the direction of the arrow *b* will therefore move the stick-hole carrier, and each motion thereof in the opposite direction will move the conveyer and the flattening-wheel.

The apparatus described above affords convenient means for operating the stick-hole carrier, conveyer, and the flattening-wheel; but it will be understood that the same may be varied in construction within the scope of the invention and that my claims are not limited to the precise arrangement of the parts. The conveyer, as shown in Fig. 2, comprises an endless chain 21, passing over sprocket-wheels 22, one of which is driven by the pinion 15. These chains are supported at their upper branches by plates or bars 23, and for supporting the glass cylinders they are provided with arms 24, preferably made of wood with lateral strengthening metal strips. These arms are made angular to provide convenient rests for the plates and are secured by plates 25 to the links of the chain in position substantially parallel with said links, being secured thereto at one end and thence extending free from or unattached to the chain, so that they may project at the turning-point, as shown at the left of Fig. 2. The chains are preferably provided with antifriction-rollers 26, which travel upon the supporting-bars 23. The stick-hole carrier 27, by which the glass cylinders are conveyed into the flattening-furnace, extends transversely to the conveyer 21 and at the end thereof and comprises an endless chain 28, which passes around sprocket-wheels 29 and extends into and through the stick-hole of the furnace. This chain has fixed to it blocks 30, having laterally-projecting arms 31, bent or curved so as to receive the glass rollers conveniently, and the blocks are grooved and are fitted between guide-bars 32, which guide and hold the same in position. As shown in Fig. 2, the arms 31 travel across the path of motion of the arms 24 of the conveyer, so that as the chains of the conveyer travel the glass cylinder carried by the arms 24 when they are in the most advanced position is deposited upon two of the arms 31.

The operation is as follows: The operator places a series of the glass cylinders upon the arms of the conveyer 21, as shown in Fig. 2, and by suitable operation of the valves above mentioned the cylinder 13 is operated intermittently, so as to move the rack-bar 12 longitudinally. At each instroke of the rack-bar the chains 21 advance one step and deposit a cylinder of glass upon the arms 31, and at the same time turn the flattening-wheel, so as to advance each flattening-stone in the furnace one step. At each outstroke of the rack 12 in the direction of the arrow b the carrier 27 is advanced, so as to move the glass cylinders carried thereby one step forward, at each motion bringing one of the cylinders into the position marked B in Fig. 1, where it is in readiness to be lifted by the flattener and placed upon the flattening-table. The gradual progression of the glass cylinder through the stick-hole into the furnace heats the glass up slowly and is very effective in preventing the breakage which is apt to result from too sudden heating. Therefore each motion of the rack-bar in one direction will turn the flattening-wheel and will deposit one of the cylinders upon the stick-hole carrier, while the reverse motion will bring a cylinder in proper position to be lifted upon the flattening-wheel in the usual way.

For the purpose of preventing the inertia of the parts from causing the flattening-wheel to move farther than it should at each operation of the motor-cylinder 13 I prefer to provide the shaft 9 with a friction-drum 33, around which is wrapped a band 34, one end of which is secured to the rack-bar or plunger of the motor 13. When the plunger reaches the end of its stroke, as shown in Fig. 2, the band 34 tightens around the drum and by friction thereon stops the parts in the proper position.

It sometimes happens in the operation of the apparatus that the glass cylinders while being carried into the furnace are broken. Such accidents are annoying and cause considerable labor, because the broken glass must be removed. I avoid all this by providing under the final position of the glass cylinder on the carrier a drop-plate 35, hinged at its outer edge at 36 and provided with an upholding-lever 37, the end of which may be weighted, as shown in Fig. 7. Beneath this drop-plate is a chamber or cage, and if a cylinder should break the operative need only lift the counterbalancing-lever 37, whereupon the plate will drop and will dump the broken glass into the chamber below, thus removing it instantly.

The advantages of the invention will be apparent to those skilled in the art.

The apparatus is simple, it is very easy to operate, and results in a great saving of labor.

It will be understood that within the scope of the invention as defined in the claims many changes in the construction of the parts may be made by the skilled mechanic.

I claim—

1. The combination with a glass-flattening oven, of a carrier extending thereinto and consisting of an endless chain having guide-blocks, and guide-bars between which they travel, said chain having lateral supporting-arms for the glass cylinders; substantially as described.

2. The combination with a glass-flattening oven, of a carrier extending thereinto, and an endless conveyer having arms which cross the path of motion of the carrier, whereby glass cylinders carried by the conveyer are deposited upon the carrier; substantially as described.

3. A carrier for carrying and transferring glass cylinders, the same comprising an endless chain having arms fixed at one end to the chain and extending thence free from the chain in a direction substantially parallel with the line thereof; and a second carrier extending in a line which is crossed by said arms as they project from the chain at the turning-point; substantially as described.

4. A carrier for carrying and transferring glass, the same comprising an endless chain having arms fixed at one end to the chain and extending thence free from the chain, substantially parallel with the line thereof, said arms being adapted to support and carry the glass and to project at the turning-point of the chain, and a receiving device situated at the turning-point of the chain, and adapted to be crossed by said arms as they project, substantially as described.

5. The combination with a glass-flattening oven, having a flattening-table, of a movable plate or bottom arranged in proximity to the flattening-table, and adapted to cause the discharge of broken glass, substantially as described.

6. The combination with a glass-flattening oven, having a flattening-table, of a movable plate or bottom arranged in proximity to the flattening-table and adapted to cause the discharge of broken glass, and a carrier extending into the oven over said plate or bottom, substantially as described.

In testimony whereof I have hereunto set my hand.

JOHN H. LUBBERS.

Witnesses:
H. M. CORWIN,
THOMAS W. BAKEWELL.